(12) United States Patent
Esch et al.

(10) Patent No.: US 8,726,409 B2
(45) Date of Patent: May 13, 2014

(54) METHOD FOR DRIVING A SCANNING PROBE MICROSCOPE AT ELEVATED SCAN FREQUENCIES

(75) Inventors: Friedrich Esch, Munich (DE); Carlo Dri, Trieste (IT); Giovanni Comelli, Udine (IT); Cristina Africh, Trieste (IT); Alessio Spessot, Gradisca d'Isonzo (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 35 days.

(21) Appl. No.: 13/230,418

(22) Filed: Sep. 12, 2011

(65) Prior Publication Data
US 2012/0066799 A1    Mar. 15, 2012

(30) Foreign Application Priority Data

Sep. 14, 2010  (EP) .................................... 10176633

(51) Int. Cl.
| | | |
|---|---|---|
| *G01Q 10/00* | (2010.01) | |
| *G01B 5/28* | (2006.01) | |
| *G01Q 20/00* | (2010.01) | |

(52) U.S. Cl.
USPC .................................. 850/1; 33/559; 73/104

(58) Field of Classification Search
USPC ............... 250/306, 310; 73/104, 105; 33/559
See application file for complete search history.

(56) References Cited

U.S. PATENT DOCUMENTS

| | | | |
|---|---|---|---|
| 5,391,871 A * | 2/1995 | Matsuda et al. .................. 850/1 |
| 2001/0038282 A1* | 11/2001 | Abe .............................. 324/210 |
| 2005/0034512 A1* | 2/2005 | Su et al. .......................... 73/104 |
| 2006/0113469 A1* | 6/2006 | Baba et al. ..................... 250/310 |
| 2008/0110248 A1* | 5/2008 | Ito et al. .......................... 73/105 |
| 2008/0134771 A1* | 6/2008 | Schimmel et al. .............. 73/104 |
| 2010/0107284 A1* | 4/2010 | Shigeno et al. ................... 850/5 |

OTHER PUBLICATIONS

Anguiano, E. et al. "Analysis of scanning tunneling microscopy feedback system: Experimental determination of parameters", American Institute of Physics, vol. 67, No. 8, Aug. 1, 1996, pp. 2947-2952.

Bredekamp, A. et al. "A Scanning Tunneling Microscope Control System with Potentiometric Capability", AFRICON, 1999 IEEE Cape Town, South Africa, Sep. 28-Oct. 1, 1999, pp. 61-66.

Behler, S. et al. "Method to Characterize the Vibrational Response of a Beetle Type Scanning Tunneling Microscope", Review of Scientific Instruments, American Institute of Physics, vol. 68, No. 1, Jan. 1, 1997, pp. 124-128.

* cited by examiner

*Primary Examiner* — Jack Berman
*Assistant Examiner* — Kevin Chung
(74) *Attorney, Agent, or Firm* — Merchant & Gould P.C.

(57) ABSTRACT

A method for operating a scanning probe microscope at elevated scan frequencies has a characterization stage of sweeping a plurality of excitation frequencies of the vertical displacement of the scanning element; measuring the value attained by the reading parameter at the excitation frequencies; and identifying plateau regions of the response spectrum of the reading parameter. The reading parameter variation is limited within a predetermined range over a predefined frequency interval, thereby defining corresponding fast scanning frequency windows in which the microscope assembly is sufficiently stable to yield a lateral resolution comparable to the one obtained during slow measurements. The measurement stage includes driving the scanning element along at least a scanning trajectory over the surface of the specimen at a frequency selected among the frequencies included in a fast scanning frequency window.

10 Claims, 3 Drawing Sheets

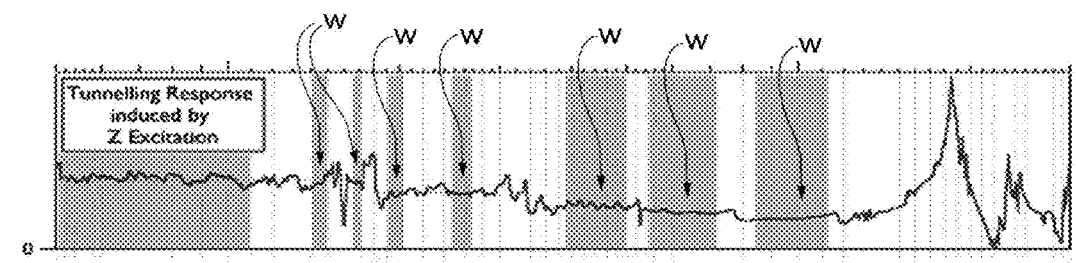
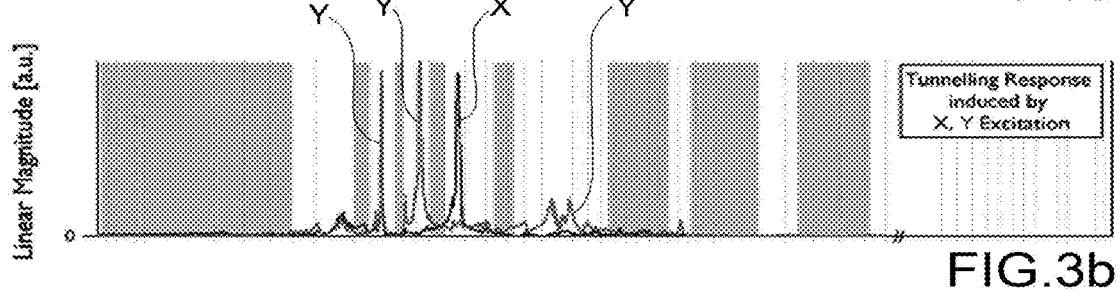
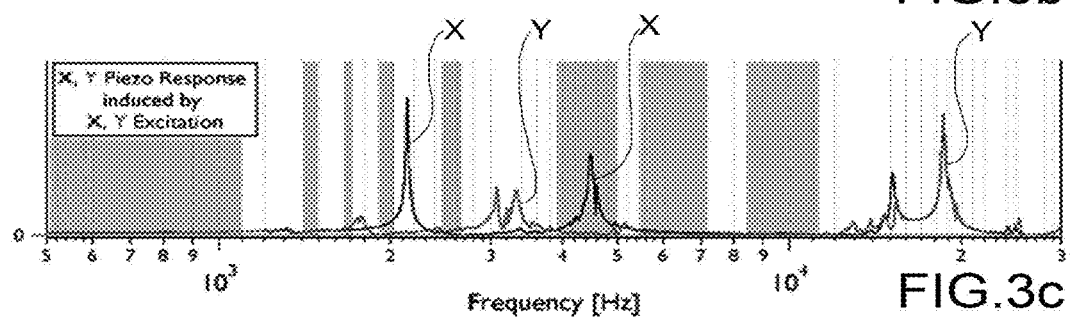
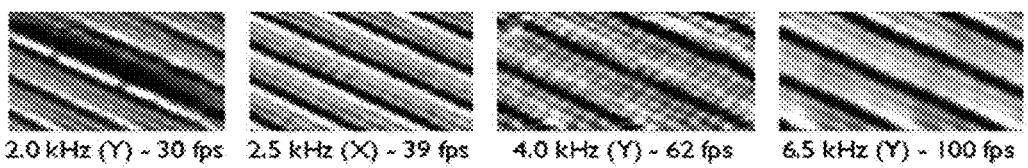

METHOD FOR DRIVING A SCANNING PROBE MICROSCOPE AT ELEVATED SCAN FREQUENCIES

This application claims benefit of Serial No. 10176633.5, filed 14 Sep. 2010 in the European Patent Office and which application is incorporated herein by reference. To the extent appropriate, a claim of priority is made to the above disclosed applications.

FIELD OF THE INVENTION

The present invention relates to scanning probe microscopes, and more specifically to a method for driving a scanning probe microscope.

Scanning probe microscopes (SPM) provide the ultimate spatial resolution at the atomic and molecular level. These local probes allow not only for imaging, but also for manipulating objects at the nanometer scale, in various environments, from vacuum and air to liquid and electrochemical cells.

A scanning probe microscope forms images of surfaces by means of a physical probe that scans the specimen. An image of the surface is obtained by mechanically moving the probe in a raster scan over the specimen, line by line, and recording the probe-surface interaction as a function of position.

BACKGROUND OF THE INVENTION

With reference to FIG. 1, a common arrangement of an SPM instrumentation 10 is shown, by taking a scanning tunneling microscope (STM) setup as a non-limitative example. A probe P, associated with a specimen S to be imaged, comprises a scanning element, such as a sharp tip T or cantilever, usually made of tungsten or platinum-iridium, carried at the end of a piezo-electric support member M. The piezo-electric member allows for performing both distance regulation between the tip and surface and scanning of the specimen under investigation. Specifically, by advancing or retracting the tip with respect to the specimen surface (along the z-axis, according to the common orientation) one can keep constant the distance between the atoms on the tip and the atoms in the surface, and control the acquisition of data in a non-contact mode. The piezo-electric member is controlled so as to move the tip in the directions parallel to the surface of the specimen (commonly identified by x- and y-axes) for achieving the scanning of the exposed surface or modifying the topography of the specimen by precisely manipulating the surface atoms. Usually, a combination of displacements of the tip in the x-, y- and z-directions is obtainable by suitable geometries of the piezo-electric member, and the most common one is a tubular geometry as depicted, having four external quadrant electrodes E whose length can be changed by means of the piezo-electric effect induced by electric fields in the piezo-electric member. Acquisition and control sections include electronic circuit arrangements performing reading of signals representative of the interactions between tip and specimen, as well as feedback control for continuously adjusting the position of the tip and define its trajectory over the surface of the specimen, respectively. The acquisition section includes amplifying means A for conditioning the electronic signal output from the tip and indicative of the physical (reading) parameter under investigation (e.g. the tunneling current in a STM arrangement or the small attractive/repulsive force between the tip and the surface with which the tip interacts in a AFM arrangement), and a processing unit U is arranged for measuring the resulting value of said parameter and for displaying information relating to it in an intelligible view onto a screen D. The control section is arranged downstream the processing unit and comprises a feedback loop from the processing unit to a driving arrangement C of the piezo-electric member, adapted to output control voltages to the electrodes so as to actuate the tip according to the operating mode of the microscope.

The time resolution of commercially available SPM instruments is one of their most severe limitations since the typical image acquisition times are of the order of seconds or more. However, most of these dedicated SPMs do not have enough time resolution to allow for observing manipulation events and local, non equilibrium dynamics on the time scale of some milliseconds, i.e. imaging rates of video rate and beyond. As a consequence, fundamental details of atomic scale dynamical processes occurring at surfaces, which are often of great fundamental and technological interest, are partially or totally lost: surface diffusion, phase transitions, self-assembly phenomena, film growth and etching, chemical reactions, conformational changes of molecules are only some examples among the infinite variety of dynamics occurring at surfaces. Motivated by this interest, driving scanning probe microscopes (SPM) at imaging rates close to video rate and beyond has become one of the core technical challenges of surface science in the last two decades.

The main factors that limit the scan speed in scanning probe microscopes are the limited bandwidth of the components of the electronic control systems, namely the control and signal detection electronics, and the mechanical resonances of the scanner. A critical limit to the time resolution is given by mechanical instabilities of the SPMs that appear as soon as the scanning frequencies reach or exceed the intrinsic resonance frequencies of the imaging system.

The fastest SPM technique is Scanning Tunneling Microscopy and in this field most of the FastSPM development has taken place; in the following we refer mainly to this technique by way of non-limitative example. The main restriction to the scan speed imposed by STM electronic control systems is the bandwidth of the fundamental components, namely the preamplifier for detection of the tip-specimen interaction (i.e. the tunneling current in STMs) and the feedback system, which has to respond or account for the spatial variations of the detected signal. The required bandwidth is in the tens of kHz range concerning the probe motion and in the MHz range concerning the preamplifier. Moreover, data acquisition and real-time processing speed can also limit the achievable performance: for instance, the acquisition of a 100×100 pixels$^2$ image at an imaging rate of 100 Hz with 16 bits requires the acquisition system to handle a minimum data stream of about 2 Mb/s (data transmission, elaboration and visualization).

While suitable, high bandwidth and high power operational amplifiers can be readily found on the market, high bandwidth preamplifiers with low noise characteristics in the $10^9$V/A ($10^8$V/A) amplification range and a frequency-independent response are not commercially available above the 50 kHz (200 kHz) bandwidth. This problem has been addressed with custom-built preamplifiers with higher bandwidths, up to 600 kHz in the $10^9$V/A range. This approach has the obvious drawback of requiring a custom design of the preamplifier, whereas in our experience, with standard 200 kHz cutoff and suitable signal post-processing, useful signal to noise ratio can be achieved also at much higher frequencies (up to 800 kHz).

When imaging in constant current mode, the limited response time of the feedback system is also of concern. Different workarounds have been developed, consisting for instance in: i) a "hybrid" feedback loop between constant current and constant height mode; ii) a combination of a dual feedback system with a dual piezo actuators, where the latter are driven by the fast and the slow feedback loops separately; iii) a combination of a feedforward and a feedback control where the height information from the last scanned line is used to predict the following line in such a way that the feedback only compensates for the differences between the two lines. The latter method is of great interest because it can correct for the unavoidable specimen tilting, which is often the major effort for the feedback loop.

The most serious limitation to the scan speed, however, is imposed by the mechanical resonance frequencies of the scanner assembly. Resonances are always excited when driving the tip close to an eigenmode frequency, and also when inducing the displacement with lower frequency signals that contain high frequency harmonics, e.g. a triangular wave.

When the scanner is driven close to resonance frequencies, two major problems arise: i) the amplitude of the probe movements in the direction of the stimulus (i.e. the amplitude of the tip oscillation or scan area) cannot be a priori predicted anymore, and ii) a coupling to other directions (orthogonal to the surface or in the slow scan direction) can occur, resulting in tip crashes and/or distorted imaging. Since the piezoelectric actuators, as coupled to their support, have by default a complicated frequency spectrum, lateral resonances often couple to vertical resonances (orthogonal to the surface), with strong impact on the obtainable imaging resolution, a crucial parameter in STM.

The problem of exciting unwanted resonances in the displacement of the tip driven by signals containing high frequency harmonics has been successfully solved with different methods, the simplest one consisting in using a pure sinusoidal wave as tip driving waveform, combined to image post-processing in order to correct for the non-uniform tip speed. The problem of piezo resonances in the direction orthogonal to the surface (that impose a limit to the scan speed) has been tackled by developing SPM scanners with very high eigenfrequencies or by using suitable active damping/vibration compensation schemes, which, however, only partially limit the effects of such resonances. An alternative but inspiring approach consists in using the resonances of the probe (in this case a tuning fork, i.e. Atomic Force Microscopy instead of STM), rather than avoiding them, thus exploiting the steady state resonant oscillation to drive either the probe itself or small specimens at high frequency. This approach, albeit still involving the development of custom built systems, proves the feasibility of scanning with resonating probes. In other words, not all the mechanical resonances harm the resolution of the STM, but a method is missing that determines unequivocally which resonances are harmful and have to be avoided.

In order to overcome these problems, the previous research has focused almost exclusively in tailoring both the electronics and the mechanics of the SPM systems with increased stiffness or lower mass, with the aim of increasing the available bandwidth and pushing the resonance frequencies of the scanners above the desired scan speeds. This has brought to life a variety of highly specialized, custom-made SPM scanners and control systems, developed to reach high imaging speeds. Different solutions have been implemented, from conical piezo geometries with increased stiffness as a substitute for the traditional cylindrical geometry, flexure-based scanners with reduced crosstalk between lateral and vertical scan directions, up to recent micromechanical systems (MEMS) composed of spring actuated membranes with extremely low mass.

However, the design, testing and commissioning process for these instruments involves a substantial effort in terms of time and money investment, not to speak about the highly specialized technical know-how that is required. The complexity of this approach is clearly unbearable for most research labs interested in fast SPM measurements. On the contrary, little or no attention has been paid to the possibility of driving commercially available, non-tailored SPMs at high imaging speed, owing to the lack of knowledge on how to deal with the presence of resonant modes of the scanner within the range of the scan frequencies of interest.

The most important information needed in order to assess the speed capabilities of an SPM instrument is the frequency response of the scanner. Various approaches have been devised to measure this function, where the difference between the methods stems from the choice of the sensor for the piezo displacement. Conceptually speaking, the simplest solution is to use a capacitive or inductive displacement sensor, but this method is not so appealing since it requires an invasive, non-trivial modification of the scanner head. In a very simple, but powerful approach, piezo displacements have recently been measured by simply exciting the motion through one of the electrode quadrants and using the voltage induced by the displacement in the opposite quadrant as a probe. Last but not least, in the case of STMs, the tunneling current can act as an extremely sensitive, simple and effective, z-displacement sensor.

These methods have been applied up to date almost exclusively for the characterization of custom-built SPMs.

SUMMARY OF THE INVENTION

The objective of the present invention is to boost the time resolution of commercial scanning probe microscopes without having to recur to a customized design of the microscope assembly which involves considerable efforts in terms of time and money investments. In other words, the object of the invention is to upgrade virtually any scanning probe microscope with fast scanning capability without any modification of the scanner and the existing control system hardware.

According to the present invention, these objectives are achieved by means of a method for driving a scanning probe microscope.

In summary, the invention is based on the principle of driving commercial scanning probe microscopes at elevated scan frequencies even above their resonance frequencies while maintaining atomic resolution. The fast scanning frequency windows in which measurements are possible even close or above the resonance frequencies of the microscope assembly are determined in a simple and reproducible way by characterising the resonances affecting the whole microscope assembly, i.e. affecting both the mechanical stability of the x-y and z scanning system and the feedback loop of the control section. More specifically, the fast scanning frequency windows in which the microscope assembly is sufficiently stable to yield a resolution comparable to the one obtained during slow measurements are determined by measuring the response of the microscope reading parameter (e.g., in the case of an STM, the tunneling current or its logarithm) when sweeping the frequency of the vertical movement of the local probe (i.e. the z-axis movement of an STM tip, orthogonal to the specimen), i.e. by exciting the series of all relevant eigenfrequencies of the microscope system through the vertical displacement of the probe (i.e. the variation of the distance between local probe and surface of the specimen). The spectrum regions where the response appears not to depend on the applied excitation frequency, i.e.

the plateau areas of the spectrum as compared with those areas in which the response is peaked by increasing and/or decreasing, designate operating frequencies for the microscope adapted to achieve optimal imaging conditions.

Advantageously, the method of the invention is of particular interest in the field of Scanning Tunneling Microscopy, were the tunneling current detection is perfectly suited for fast detection.

BRIEF DESCRIPTION OF THE DRAWINGS

Further advantages and characteristic features of the present invention will become clear from the detailed description which follows, with reference to the accompanying drawings, provided purely by way of non-limitative example, in which:

FIGS. 3a-3c are plots of the microscope response versus frequency, showing the resonance behavior of an STM by various excitation/detection methods, and FIG. 3d is a collection of atomically resolved images acquired at different scan frequencies.

DETAILED DESCRIPTION OF PREFERRED EMBODIMENTS

Figure 1:
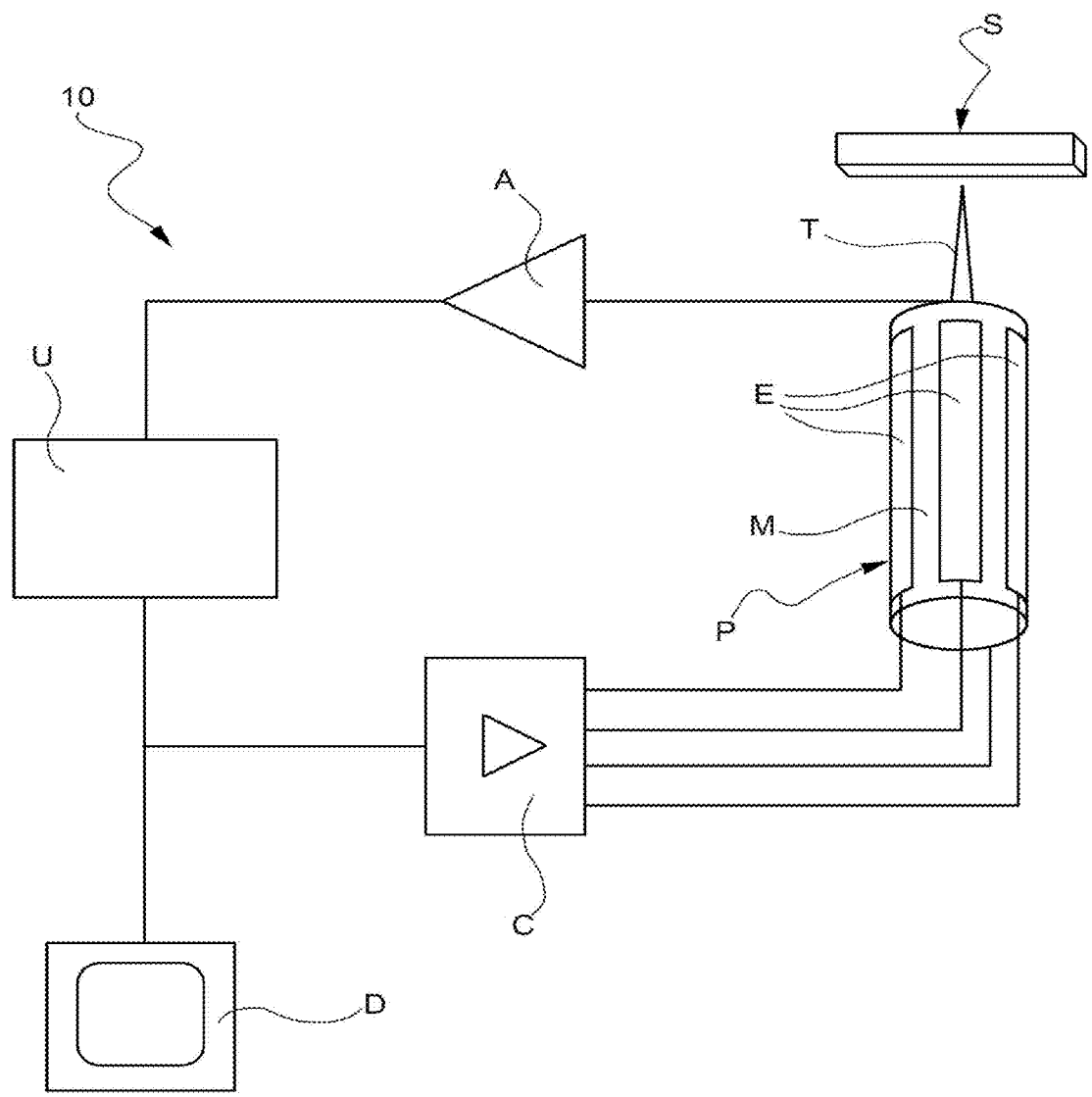
FIG. 1 is a schematic block diagram of a conventional scanning probe assembly.
Figure 2:
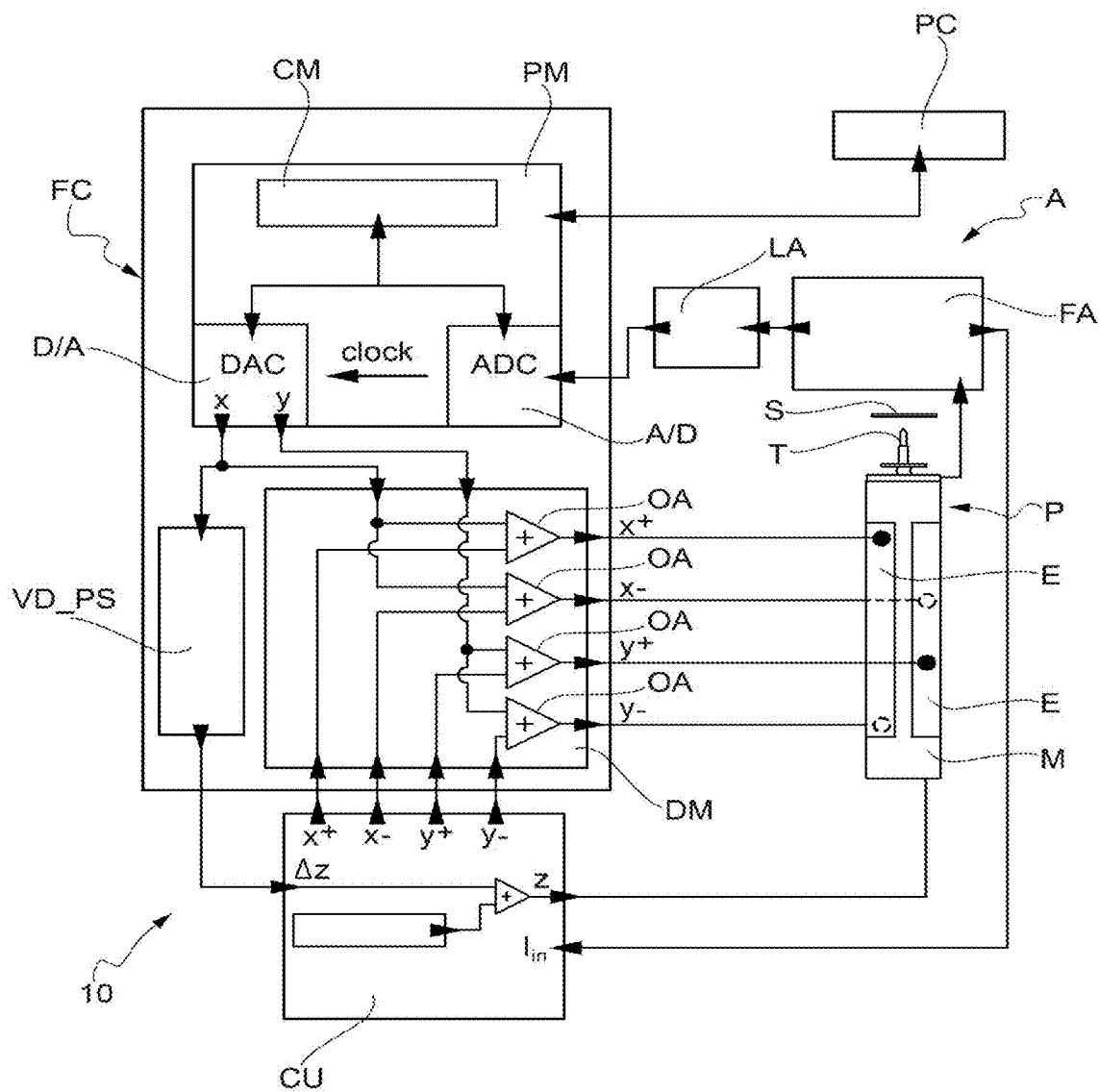
FIG. 2 is a schematic block diagram of a scanning probe assembly according to the invention.

With reference to FIG. 2, the arrangement of the SPM instrumentation according to the invention is shown, where like references are used to refer to the same components as defined in FIG. 1. A scanning tunneling microscopy arrangement 10 is here below disclosed as a preferable embodiment, but a skilled person would clearly realize that the method of the invention is adapted for any technique of scanning probe microscopy.

A probe P associated with a specimen S to be imaged is shown, which comprises a scanning element, such as a sharp tip T or cantilever, carried at the end of a piezo-electric support member M. The piezo-electric member allows for performing both distance regulation between the tip and surface and scanning of the specimen under investigation. The piezo-electric member is controlled so as to move the tip in the directions parallel to the surface of the specimen (commonly identified by x- and y-axes) for achieving the scanning of the specimen surface, and to move the tip by advancing/retracting it with respect to the specimen surface for measurement purposes. The geometry of the piezo-electric member M is exemplarily a tubular geometry. The piezo-electric member M has four quadrant electrodes E whose length can be changed by means of the piezo-electric effect induced by respective control signals, so as to achieve a combination of displacements of the tip in the x-, y- and z-directions.

A conventional acquisition and control section includes amplifying means A for conditioning the electronic signal output from the tip and indicative of the physical (reading) parameter under investigation (e.g. the tunneling current in a STM arrangement or the small attractive/repulsive force between the tip and the surface specimen in a AFM arrangement). A signal $I_{in}$ is output from amplifying means A to a conventional control unit CU of the piezo-electric member, which is adapted to output control voltages (z) to the electrodes so as to actuate the tip along the z-axis so as to continuously adjust its (average) position with respect to the specimen surface. In a constant-current mode the tip is moved over the surface of the specimen and its position along the z axis is controlled so as to maintain constant its distance to the specimen, i.e. the measured current. The current is maintained constant by means of a feedback circuit arranged to detect the tunneling current and change the z position of the tip so as to maintain the tunneling current at a preset value. The loop gain determines the reaction rate of the feedback system.

The control unit is upgraded according to the invention by providing the fast control arrangement module FC.

The fast control module FC comprises a processing module PM and a driving module DM. The processing module PM is arranged downstream an amplifying chain that includes a fast preamplifier FA and a log amplifier LA, and comprises an analog-to-digital converter (A/D) and a digital-to-analog converter (D/A) both coupled to an embedded computing module CM and driven by a common synchronizing clock signal, where the D/A is triggered by the A/D converter. Since the tunneling current in a STM arrangement depends exponentially on the tip-surface distance, the tunneling current—as measured by the pre-amplifier—is logarithmized by a further amplifier LA. This compresses the data and yields a topography-related signal that is acquired by the fast control module FC and buffered by the embedded computing module CM before being transferred to the host PC. The driving module DM includes a plurality (a bank) of high voltage power operational amplifiers OA associated with respective electrodes E of the piezo-electric member, to which they feed corresponding control signals denoted x+, x−, y+, y− at voltages of the order of magnitude of 140 V. Each operational amplifier OA is adapted to receive as a first input a respective offset signal $x_o^+$, $x_o^-$, $y_o^+$, $y_o^-$ indicative of the discrete position of the tip along the x and y axes reached according to a slow scanning protocol, which is issued by the conventional control unit CU as a voltage signal having an order of magnitude of tens of volts. Each operational amplifier OA is adapted to receive as a second input a fast scanning waveform signal $x_{fast}$ and/or $y_{fast}$ which is, at least in one fast scanning direction, preferably a sinusoidal voltage signal of the order of magnitude of hundreds of millivolts up to several volts in the case of very low transfer function values. The fast scanning waveform is superimposed to the slow scanning (offset) signal for performing fast scanning in a region of a few nanometers or more around the offset position.

In order to avoid excitation of resolution deteriorating mechanical resonances at adjacent frequencies, the fast scanning movement is applied in form of a perfect sine wave that is smoothly switched on and off by increasing/decreasing the scanning amplitude. Scan wave and data acquisition have to be perfectly synchronized in order to control the phase shifts to be applied in a reproducible and stable fashion. The synchronizing clock signal is applied between the analog-to-digital converter A/D that receives the signals indicative of the current intensity measured at the tip, and the digital-to-analog converter D/A converting the sinusoidal waveform generated by the embedded computing module CM. Specifically, the sinusoidal waveform is applied synchronously with the acquisition of the scanning data by duly taking into account a predetermined phase delay introduced by the acquisition signal travelling along the feedback path and the electronics which is constant and can be therefore easily compensated.

A host PC (PC) is provided, e.g. external to the fast control module FC, and is adapted to acquire from the embedded computing modules CM the stored measurement data by means of an Ethernet connection, for example, and generate a corresponding visual image.

The fast scanning operation of the tip may be advantageously performed along at least one of the two orthogonal scanning directions (x, y) over the specimen. By way of example, the following description is given for a fast control module where the x direction has been selected as the fast scanning direction.

The fast control has been implemented into a unique module FC that is inserted between a commercial SPM control system and a commercial STM, as shown schematically in FIG. 2. The underlying idea behind the design of the module is to obtain an instrument that has to appear as totally "transparent" to the original control system, thus not modifying any of the control characteristics of the original circuitry and acquisition system. This design proves the feasibility of a simple, general add-on system for FastSTM measurements. In general, however, the fast acquisition and control could as well easily be integrated directly into the conventional control unit CU via additional software, if the hardware support for fast scanning signal generation and detection is given.

In a STM arrangement, the tunneling current that can be acquired at high speed by the fast preamplifier FA is used as both the feedback and the imaging signal.

Since the feedback loop of the conventional STM electronics has a very limited bandwidth compared to what would be required in order to scan in constant current mode with the fast scanning technique, it has been chosen to use a hybrid constant height and constant current mode and acquire the logarithm of the tunneling current at the input of the analog-to-digital converter of the fast control module.

Indeed, in principle, the feedback loop implemented in the CU could be simply switched off when scanning with the fast scanning mode. However, our experience shows that, by setting the response at low gain values in order to avoid excitation of mechanical resonances by the feedback loop itself, the feedback loop can be successfully exploited to follow the unavoidable specimen tilting in the slow scanning direction.

In order to compensate for a possible lateral inclination of the specimen with respect to the tip (specimen tilting) in the fast scanning direction, e.g. due to mounting tolerances giving rise to a typically constant inclination, which cannot be compensated by the slow feedback, the fast sine wave scan voltage is applied as a $\Delta z$ additive offset to the z drive of the tip at the control unit CU as well, appropriately attenuated and phase-shifted.

Advantageously, a voltage divider and phase shifter module VD_PS is provided between the fast control module FC and the control unit CU, it being arranged for using the same sinusoidal waveform generated for the fast scanning movement also for controlling the vertical position of the tip with respect to the inclined specimen.

The voltage divider is needed for lowering the voltage used for controlling the piezo-electric member in the lateral movement so as to achieve a voltage suitable for controlling the smaller vertical movement of the tip. The sine wave on the z motion combined with the sine wave on the lateral fast scanning induces the tip to follow the specimen tilting.

While the amplitude controls the slope of the correction, fine control on the phase is required in order to eliminate any phase difference between the x and z movements of the piezoelectric member, for instance due to the different paths of the two signals inside the electronics of the processing module PM, the driving module DM of the fast control module FC and the feedback path inside the CU.

Since the tip movement results from the combination of two orthogonal sine waves, the speed of the tip at the start and at the end of the scan lines is zero, allowing the tip for a smooth change between the forward/backward scan directions without exciting higher order harmonics.

Along the slow scanning direction (the y axis in the embodiment disclosed) the compensation for the height position of the tip achieved by the feedback of the microscope control system is adequate.

According to the invention, the implementation of the fast scanning measurements in a conventional SPM control system as disclosed is dependent on the existence of frequency windows in which the SPM is sufficiently stable to yield a resolution comparable to the one obtained during slow measurements. The "quiet" fast scanning frequency windows in which Fast SPM measurements are possible even close or above the resonance frequencies of the microscope are obtained in a simple and reproducible way by means of the following protocol.

Actually, in order to allow for such a characterization on a short timescale, and for a variety of imaged substrates, methods based on image analysis are practically not feasible. Indeed, they work only in specific cases and are extremely time consuming.

The protocol of the invention is based on measuring the response of the scanning probe microscope reading parameter (here, in the case of an STM, the logarithm of the tunneling current) when sweeping the frequency of the vertical movement of the local probe (here: z movement of an STM tip on a single tube scanner, excitation amplitude below a few $Å_{p-p}$), which can easily be achieved for instance with a network analyzer. This sweeping operation is carried out for the characterization of a specific microscope assembly and measurement set-up, that is each time a tip is substituted in the microscope probe or a specimen is mounted for being imaged, before a set of measurements is performed.

A sinusoidal control signal is imposed to the tip by the control unit CU for controlling its movement along the z (vertical) axis and the frequency of the sine waveform is increased from a minimum frequency which is dependent upon the first resonance frequency of the microscope assembly, e.g. a frequency well below the first resonance frequency of the microscope assembly, such as a frequency of 200 Hz, to a maximum frequency which is, typically but not necessarily lower than the first vertical resonance frequency of the microscope assembly, e.g. a frequency of 30 kHz, at a step which may be fixed or variable. For each frequency the reading parameter is measured under low feedback conditions including the pre-amplifier, log amplifier and the control unit itself. The sweeping operation can be carried out at any convenient position of the tip with respect to the specimen, for example at the start position of the scanning movement. This implies that the frequency characterization can be performed in situ, immediately before taking a fast image measurement.

Such a measurement is displayed in FIG. 3a. The plateau areas (frequency windows) that can be observed where the tunneling response appears not to depend on the applied excitation frequency are marked by grey background and indicated W. These plateaus are separated by areas in which the tunneling response is peaked, increasing and/or decreasing with respect to the adjacent plateaus.

Well-defined plateaus W are a clear indicator for perfect imaging conditions (see imaging examples with atomic resolution in FIG. 3d). These imaging conditions are stable enough that often it is possible to measure for considerable time (i.e. minutes to hours) without losing tip resolution. Moreover, probably due to the fast shaking-like movement that provides a cleaner, more stable tip apex, the tip resolution sometimes is even enhanced with respect to standard conditions, and substrates that interact strongly with the tip can often better be imaged at elevated frequencies.

The plateau areas W can be revealed automatically by comparing the response parameter value over a predefined frequency interval with a predetermined range of variation of said value with frequency. The plateau areas are identified as those where the response parameter variation is limited within a predetermined range, and is independent of the excitation frequency. Then, a frequency belonging to one of the detected plateaus W may be chosen as the fast scanning frequency. Moreover, the frequencies which are harmful for the resolution can be recognized as transitions between two different plateau levels.

The new measurement protocol that has been developed allows for the first time an exhaustive characterization of all the relevant mechanical resonances of a SPM to be obtained that are harmful to the microscope resolution.

The method according to the invention, albeit so simple and straightforward, has not been proposed up to now for the characterization of the resonances. What had been previously proposed, was to use the voltage response generated in one of the two symmetric electrodes of the piezo-electric member as a probe for the lateral displacement induced by a voltage applied to the opposite electrode. Since this response is proportional to the deformation of the piezo-electric member, eigenfrequencies of the SPM can be detected. However, this measurement method characterizes only the mechanical stability of the scanner itself and does not take into account all microscope frequencies, including also the interaction with the feedback loop and instabilities of the whole setup, since the measurement is not performed in the vicinity of the specimen. Some frequencies are therefore not perceived, as can be seen in FIGS. 3b and 3c showing the tunneling signal vs. scanning mechanical displacement of the probe. The frequency of around 1.6 kHz is only measured when the tunneling current is measured as local probe parameter in function of the lateral displacement. Moreover, some resonances that are perceived without tunneling contact have no strong influence on the resolution, such as the resonance at 4.5 kHz in a frequency window where good imaging conditions are achieved. We conclude that these two previously proposed characterization techniques that are based on the lateral displacement as modulation parameter are not sufficient to predict unambiguously where the imaging conditions will be stable.

On the contrary, good imaging conditions can only unambiguously be predicted with the method according to the present invention, i.e. when the vertical displacement of the probe (i.e. the variation of the distance between local probe and surface of the specimen) is used to excite the series of all relevant eigenfrequencies of the system. We have proven that commercial SPMs can be driven above their resonance frequencies while maintaining atomic resolution, provided that appropriate fast scanning frequency windows are chosen. The innovation method allows for unequivocal assignment of these frequency windows where also conventional SPMs can be driven at elevated scan frequencies.

The method allows therefore to reliably determine the frequency windows where conventional SPMs can be operated using scanning frequencies between, above or also on top of mechanical resonances. The method can be easily implemented in current commercial SPM control systems, boosting their time resolution well above the manufacturer's specifications. One can thus avoid to build customized SPMs with elevated resonance frequencies above the fast scanning frequency. This paves finally the way for the implementation of a new fast SPM operation mode in conventional SPMs at specific, fast scanning frequencies and for high time resolution measurements. The simplicity of the implementation together with the possibility to upgrade older, dedicated SPMs with a new functionality has a considerable commercial potential in the expanding market of nanotechnology.

In contrast to other approaches for the characterization of the mechanical stability of SPMs, this method is simple, reliable and fast. The analysis is based on the standard measurement setup and therefore does not require additional components apart from a lock-in function of the hardware/software. The method can be executed directly in the measurement configuration. By conventional measurements, therefore, an area of interest and the corresponding lateral offset values can be determined, at which subsequently fast measurement is performed. Slow and fast measurements can therefore be performed in series, seamlessly.

The method can be implemented in principle into all sorts of SPMs/SPM control systems. Alternatively, on can develop add-on modules based on the innovative system described above. The module can be inserted in a transparent way between the SPM control section and the SPM probe (i.e. without changes of the original control system) and increases the time resolution by several orders of magnitude without significant loss in lateral resolution. Advantageously, the method of the invention permits to drive conventional SPMs dedicated to various environments, from vacuum and air to liquid and electrochemical cells, in an easy way that is accessible for a large community of users. It is therefore of general interest for all companies that build SPMs and SPM controllers, and that could thus offer added functionality at limited implementation costs—i.e. without the need to engineer a specific scanning system with high eigenfrequencies.

In addition, the fast scanning has been shown to bring along an unexpected stability in the resolution of the images over time, critical for applications where the surface interacts strongly with the local probe.

It is expected that the simple implementation in SPMs and the consequent huge increase in time resolution by several orders of magnitude will inspire a lot of new applications. Besides the possibility to follow dynamical processes at surfaces, for instance the diffusion of atomic scale objects, chemical reactions at model system catalyst surfaces, important developments will concern the close control of manipulation processes at the nanoscale immediately after the variation of an external parameter. This will have immense applications in the field of basic research on surface non-equilibrium phenomena (e.g. electrochemistry with atomic resolution upon potential changes or photochemistry upon specimen illumination). In a similar way, effects induced by charge injection from the tunneling tip can be studied immediately after their onset, as well as growth and charge transport phenomena in organic electronics. These processes will become interesting also for applications in industry. In this field, fast SPM characterization of surfaces can be carried out during surface treatments, e.g. during annealing.

Since the fast scanning shows advantages in resolving strongly interacting substrates (like oxide substrates at elevated temperatures or reactive monomers in covalent network bond formation) and since it is additionally less prone to thermal drift problems than conventional, slow imaging, one can envisage a completely new way to gain high resolution images: instead of single, slow measurements with low imaging stability, a series of fast measurements is taken where the average out of a large set of images with similar resolution leads to high resolution images of otherwise not observable surface systems.

A further advantage of the determination of stable plateau regions would be the introduction of an advanced, fast feedback system in which the vertical position of the scanning element is adjusted under constant current or equivalent reading parameter conditions, in a scanning probe microscope. This special feedback system is featured in such a way as to respond only within the plateau regions of the response spectrum of the reading parameter (i.e., within the frequency windows that have been previously characterized as stable).

Naturally, the principle of the invention remaining the same, the forms of embodiments and details of construction may be varied widely with respect to those described and illustrated purely by way of non-limiting example, without thereby departing from the scope of the present invention as defined in the appended claims.

What is claimed is:

1. A method for operating a scanning probe microscope having a probe, adapted to be associated with a specimen to be imaged, equipped with a scanning element carried by a piezoelectric support member arranged for performing distance regulation between the scanning element and the surface of the specimen under investigation and for moving the scanning element in directions parallel to the surface of the specimen for achieving the scanning of the surface, the method comprising:
driving the scanning element along at least a scanning trajectory over the surface of the specimen;
acquiring an electric signal indicative of a predetermined reading parameter representative of the interaction between the scanning element and the specimen at each scanning position; and
adjusting the height of the scanning element over the specimen as a function of the acquired signal;
i) a characterization stage, including:
sweeping a plurality of excitation frequencies of the vertical displacement of the scanning element;
measuring the value attained by the reading parameter at the excitation frequencies; and
identifying plateau regions of the response spectrum of the reading parameter, wherein the reading parameter variation is limited within a predetermined range over a predefined frequency interval, defining corresponding fast scanning frequency windows, and
ii) a measurement stage, including driving the scanning element along at least a scanning trajectory over the surface of the specimen at a frequency selected among the frequencies included in a fast scanning frequency window.

2. A method according to claim 1, wherein sweeping a plurality of excitation frequencies of the vertical displacement of the scanning element comprises imposing a sinusoidal control signal to the scanning element for actuating displacement of the scanning element at a plurality of subsequent discrete frequencies from a minimum frequency below the first resonance frequency of the microscope.

3. A method according to claim 1, wherein sweeping a plurality of excitation frequencies of the vertical displacement of the scanning element comprises imposing a sinusoidal control signal to the scanning element for actuating displacement of the scanning element at a plurality of subsequent discrete frequencies up to a maximum frequency which is lower than the first vertical resonance frequency of the microscope.

4. A method according to claim 1, wherein the characterization stage is performed for each scanning element associated with the microscope probe or for each specimen presented to the microscope for investigation.

5. A method according to claim 1, wherein the characterization stage is performed when the scanning element is located at a start position of the scanning movement over the surface of the specimen.

6. A method according to claim 1, wherein the measurement stage comprises performing measurements in a hybrid constant height and constant current mode.

7. A method according to claim 6, wherein the fast scanning waveform is a sine wave that is smoothly switched on and off by increasing or decreasing the scanning amplitude.

8. A method according to claim 6, wherein the measurement stage comprises a feedback loop control for adjusting the average vertical position of the scanning element with a low loop gain.

9. A method according to claim 7, wherein the fast scanning sine waveform is applied as an additive offset to the vertical drive of the scanning element.

10. A method according to claim 1, wherein the vertical position of the scanning element is adjusted with a fast feedback system that responds only within the plateau regions of the response spectrum of the reading parameter.

* * * * *